(No Model.)
J. T. PEDERSEN.
COUPLING FOR DENTAL ENGINE SHAFTS AND HAND PIECES.
No. 472,683. Patented Apr. 12, 1892.
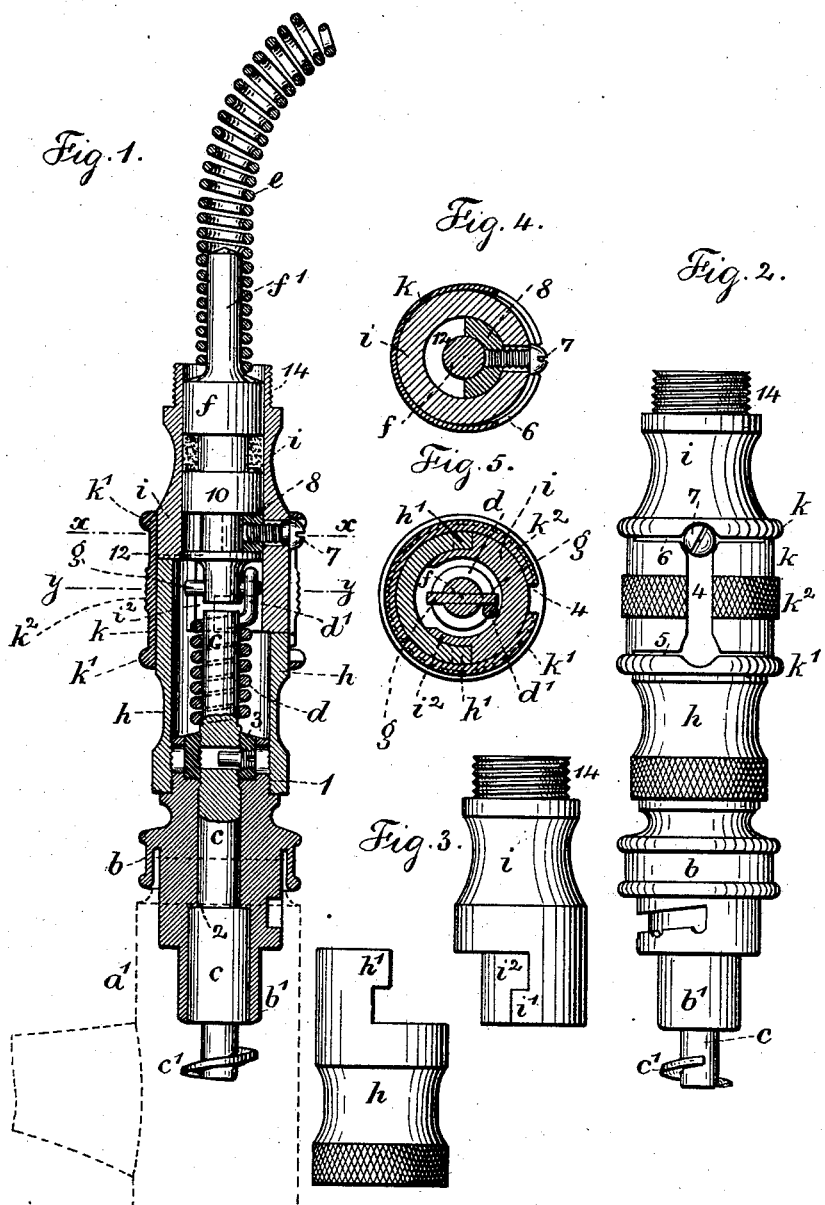

UNITED STATES PATENT OFFICE.

JOHANNES TH. PEDERSËN, OF NEW YORK, N. Y., ASSIGNOR TO WILLIAM E. WELLS, OF SAME PLACE.

COUPLING FOR DENTAL-ENGINE SHAFTS AND HAND-PIECES.

SPECIFICATION forming part of Letters Patent No. 472,683, dated April 12, 1892.

Application filed August 25,1891. Serial No. 403,682. (No model.)

*To all whom it may concern:*

Be it known that I, JOHANNES TH. PEDERSËN, a citizen of the United States, residing at the city, county, and State of New York, have invented certain new and useful Improvements in Couplings for Connecting Flexible Dental-Engine Shafts and Dental Hand-Pieces, of which the following is a specification.

My invention relates to improvements in couplings for connecting the flexible shaft of a dental engine with a dental hand-piece; and it consists in the novel construction of the parts of the coupling and devices for transmitting motion, and the various combinations and arrangements of parts, as hereinafter more fully set forth.

In the drawings, Figure 1 is a vertical section and partial elevation illustrating my improvements. Fig. 2 is an elevation of the same at right angles to Fig. 1. Fig. 3 is a detached elevation of the separated parts of the coupling without the sleeve. Fig. 4 is a cross-section at the line $x\ x$ of Fig. 1, and Fig. 5 is a cross-section at the line $y\ y$ of Fig. 1.

$a\ a'$ in dotted lines represent the stock of a dental hand-piece and its upper end.

$b$ represents an adjustable sleeve-bearing, and $b'$ its reduced end within the stock. Passing through this bearing is a shaft $c$, having a shoulder 2, and at its end the spiral rotating cam $c'$, employed to operate the hammer of a dental mallet. The upper end of the sleeve $b$ is threaded at 1 and recessed for the collar 3, which is screwed upon the upper end of the shaft $c$ and is pinned thereto, said shaft being free to rotate within said sleeve, but endwise movement being prevented by the shoulder and collar 3. Upon the extreme upper end of the shaft $c$ is a helical-spring clamp $d$, with a finger end $d'$ frictionally held to the shaft $c$.

$e$ represents the flexible dental-engine shaft, by the rotation of which the dental hand-piece is operated. This is connected to the end $f'$ of the shaft $f$. This shaft $f$ is made with collars, between which lubricating material may be held, and this shaft $f$ passes through one part $i$ of the two-part coupling, and said shaft is held in place by the segmental nut 8 and screw 7, the screw 7 passing through the part $i$ into the nut, and the nut being between the collars 10 and 12 of the shaft $f$, and upon the lower end of this shaft $f$ is a cross-pin $g$, adapted to bear against the finger end $d'$ of the spring-clamp $d$, whereby the shaft $c$ is made to partake of the rotary motion of the driving-shaft $f\ f'$. The flexible cover of the flexible shaft $e$ is to be connected to the part $i$ of the coupling at the threaded portion 14, and the portion $h$ of the coupling is connected to the bearing-sleeve $b$ at its threaded end 1. The portions $h\ i$ of the coupling are tubular and cylindrical and provided with similar interlocking jaws $h'\ i'$ on the respective parts that come together laterally, the part $i$ having in addition circular guide-flanges $i^2$ formed with the jaws and adapted to enter or fit within the jaws $h'$, as shown in the cross-section, Fig. 5, for the purpose of steadying the parts and preventing lateral movement when the parts are brought together.

I provide a sleeve $k$, the objects of which are to act as a binding to the union of the parts $h\ i$ of the coupling and to prevent said parts separating. This sleeve $k$ has ribbed ends $k'$ and a roughened center $k^2$ to respectively strengthen and assist in moving said sleeve. The sleeve $k$ is slotted longitudinally at 4, and said slot has rounded ends, and said sleeve is cut through crosswise at 5 6 to form adjacent spring-jaw ends out of the sleeve between said cuts 5 6. This sleeve $k$ is held in place upon the part $i$ by the screw 7 and said sleeve is adapted to surround both parts $h\ i$ of the coupling and to move longitudinally, the screw 7 occupying its respective positions at the ends of the slot 4 as the sleeve $k$ is moved endwise to couple or uncouple the parts $h\ i$. The head of the screw 7 rests freely in the rounded ends of the slot 4 in the respective positions of the sleeve $k$, and the slot 4 is slightly narrower than the diameter of the screw-head, so that some force is required to move the sleeve endwise, and the parts cannot be accidentally uncoupled. Fig. 4 represents the screw as about midway of the slot 4 and shows the adjacent parts of the sleeve as under tension and sprung outward on the face of the screw-head, from which they return with a snap as the screw-head enters either rounded end of the slot 4.

I do not limit myself to the use of the cross-pin $g$ and spring $d$ and finger $d'$ in connection with the two-part coupling $h\ i$, as some other construction for connecting the shafts $c$ and $f$ might be employed with my improved two-part coupling without changing the construction of said coupling.

My improved coupling is simple in construction and is easily operated and is very efficient in its working.

I claim as my invention—

1. The combination, with a flexible dental-engine shaft and a dental hand-piece, of a two-part coupling having similar laterally-interlocking jaws and a longitudinally-movable connecting and binding sleeve, substantially as specified.

2. The combination, with a flexible dental-engine shaft and coupling connected therewith, of a dental hand-piece, the adjustable sleeve-bearing $b$, the shaft $c$, the pinned collar 3, the helical-spring clamp $d$, its finger $d'$, and the cross-pin $g$, substantially as set forth.

3. The combination, with a flexible dental-engine shaft and two-part coupling, of a shaft $f f'$, having collars 10 12, the segmental nut 8, and screw 7, substantially as set forth.

4. The combination, with the shafts $c$ and $f f'$ and the devices for transmitting motion from the one to the other, of the two-part coupling $h\ i$, the interlocking jaws $h'\ i'$, adapted to come together laterally, the guide-flanges $i^2$, and a surrounding and longitudinally-movable and binding sleeve $k$, substantially as set forth.

5. The combination, with the two-part coupling $h\ i$, having interlocking jaws coming together laterally, of the binding-sleeve $k$, surrounding the same and movable longitudinally thereon, said sleeve having a longitudinal slot at 4 with rounded ends and cross-cuts at 5 6 to form spring-jaws, and the screw 7, substantially as and for the purposes set forth.

6. The combination, with the shafts $c$ and $f$, of a helical-spring clamp $d$ and finger $d'$ and the cross-pin $g$, whereby the rotation of one shaft is communicated to the other, so that they move together, substantially as set forth.

Signed by me this 14th day of August, 1891.

JOHANNES TH. PEDERSEN.

Witnesses:
  GEO. T. PINCKNEY,
  HAROLD SERRELL.